United States Patent
Devlin et al.

(10) Patent No.: US 11,202,530 B2
(45) Date of Patent: Dec. 21, 2021

(54) DESCALING MODULE

(71) Applicant: B/E Aerospace, Inc., Winston-Salem, NC (US)

(72) Inventors: Byron A. Devlin, Parkville, MO (US); Anthony D. Serfling, Kansas City, MO (US); Christopher J. Painter, Kansas City, MO (US); Keith R. DeBald, Gardner, KS (US)

(73) Assignee: B/E Aerospace, Inc., Winston-Salem, NC (US)

( * ) Notice: Subject to any disclaimer, the term of this patent is extended or adjusted under 35 U.S.C. 154(b) by 195 days.

(21) Appl. No.: 16/409,235

(22) Filed: May 10, 2019

(65) Prior Publication Data

US 2020/0352391 A1  Nov. 12, 2020

(51) Int. Cl.
*A47J 31/60* (2006.01)
*B08B 3/08* (2006.01)

(52) U.S. Cl.
CPC .......... *A47J 31/60* (2013.01); *B08B 3/08* (2013.01)

(58) Field of Classification Search
None
See application file for complete search history.

(56) References Cited

U.S. PATENT DOCUMENTS

| 2004/0118291 | A1* | 6/2004 | Carhuff | A47J 31/4485 99/275 |
| 2010/0229729 | A1* | 9/2010 | Garcia | A47J 31/60 99/281 |
| 2014/0060338 | A1 | 3/2014 | Tembaak et al. | |
| 2018/0192818 | A1* | 7/2018 | Epping | A47J 31/46 |

FOREIGN PATENT DOCUMENTS

| WO | 2013188246 A2 | 12/2013 | |
| WO | WO-2015059213 A1 * | 4/2015 | C02F 5/025 |

OTHER PUBLICATIONS

Extended Search Report dated Jun. 5, 2020 for EP Application No. 19208924.
Extended Search Report for European Application No. 19208924.1 dated Jun. 5, 2020, 7 pages.

* cited by examiner

*Primary Examiner* — Cristi J Tate-Sims
(74) *Attorney, Agent, or Firm* — Suiter Swantz pc llo (57) ABSTRACT

A descaling module is disclosed. In one or more embodiments, the descaling module includes a container configured to receive a descaling fluid. The descaling module further includes at least one input port and at least one output port. The input port is configured to couple the container to a respective brew head of the beverage maker. The output port is configured to flow the descaling fluid through a fluid path of the beverage maker when pressurized fluid enters the container through the input port and forces the descaling fluid through the output port.

20 Claims, 6 Drawing Sheets

DESCALING MODULE

BACKGROUND

Beverage makers (e.g., espresso machines) can brew espresso by forcing hot water through a concentrated mass of ground coffee. The resulting liquid is collected and consumed. The path of water through beverage maker's reservoir, tubing, filters, and so forth are typically constructed of metal (e.g., brass, stainless steel), rubber, and/or plastic. Minerals naturally occurring in water (e.g., calcium, magnesium) are often deposited onto inner surfaces of beverage maker components in the form of limescale. Deposits of limescale may shorten the lifespan of beverage maker components. In addition, limescale is difficult to remove, is unsightly, and can affect the taste of the espresso.

One method of preventing the buildup of limescale is through regular cleaning of the beverage maker with a descaling solution (e.g., a low pH solution). In a descaling cleaning, descaling fluids are circulated through the beverage maker for a set period of time. Once used, the descaling solution is removed from the beverage maker and discarded. The beverage maker is then rinsed with water before being put back into use.

Beverage makers on aircraft may require descaling on a regular basis. Descaling a beverage maker on an aircraft can be difficult, as the beverage maker unit may need to be removed, partially removed, and/or partially disassembled in order to access the ports needed for adding the descaling solutions. These methods are laborious and time consuming. Consequently, there is a need for improved descaling processes and/or devices.

SUMMARY

A descaling module is disclosed. In one or more embodiments, the descaling module includes a container configured to receive a descaling fluid. The descaling module further includes at least one input port and at least one output port. The input port is configured to couple the container to a respective brew head of the beverage maker. The output port is configured to flow the descaling fluid through a fluid path of the beverage maker when pressurized fluid enters the container through the input port and forces the descaling fluid through the output port.

In some embodiments of the descaling module, the descaling module further includes a detectable element configured to indicate at least one of a presence of the descaling module or an identity of the descaling module.

In some embodiments of the descaling module, the descaling module further includes a fill port for dispensing the descaling fluid into the container.

In some embodiments of the descaling module, the descaling module further includes at least one pickup tube coupled to the output port and extending into the container. The pickup tube may be configured to direct the descaling fluid through the output port of the container when pressurized fluid enters the container.

In some embodiments of the descaling module, the descaling module further includes a handle on an external surface of the container.

In some embodiments of the descaling module, the descaling module further includes a shield disposed adjacent to the at least one input port and configured to redirect fluid escaping from the input port or the output port toward the beverage maker.

In some embodiments of the descaling module, the descaling module further includes at least one retaining tab configured to releasably secure the descaling module in an operating position when the descaling module is disposed within a brew cavity of the beverage maker.

In some embodiments of the descaling module, the descaling module further includes a safety valve.

In some embodiments of the descaling module, the safety valve is coupled to an at least partially transparent tube configured to direct fluid released from the safety valve away from the descaling module.

In some embodiments of the descaling module, the descaling module further includes a pump configured to pump the descaling fluid from the container into the beverage maker.

A system is also enclosed. In one or more embodiments, the system includes a beverage maker and a descaling module configured to be at least partially disposed within a brew cavity of the beverage maker. The descaling module includes a container configured to receive a descaling fluid. The descaling module further includes at least one input port and at least one output port. The input port is configured to couple the container to a respective brew head of the beverage maker. The output port is configured to flow the descaling fluid through a fluid path of the beverage maker when pressurized fluid enters the container through the input port and forces the descaling fluid through the output port.

In some embodiments of the system, the descaling module further includes a detectable element configured to indicate at least one of a presence of the descaling module or an identity of the descaling module.

In some embodiments of the system, the beverage maker further includes a detector that is configured to sense the detectable element of the descaling module.

In some embodiments of the system, the beverage maker includes a controller communicatively coupled to the detector. The controller is further configured to detect the presence and/or the identity of the descaling module when the detector senses the detectable element of the descaling module.

In some embodiments of the system, the descaling module further includes a fill port for dispensing the descaling fluid into the container.

In some embodiments of the system, the descaling module further includes at least one pickup tube coupled to the output port and extending into the container. The pickup tube may be configured to direct the descaling fluid through the output port of the container when pressurized fluid enters the container.

In some embodiments of the system, the descaling module further includes a handle on an external surface of the container.

In some embodiments of the system, the descaling module further includes a shield disposed adjacent to the input port and configured to redirect fluid escaping from the input port or the output port toward the beverage maker.

In some embodiments of the system, the descaling module further includes at least one retaining tab configured to releasably secure the descaling module in an operating position when the descaling module is disposed within the brew cavity of the beverage maker.

In some embodiments of the system, the descaling module includes a safety valve.

In some embodiments of the system, the safety valve of the descaling module is coupled to an at least partially transparent tube configured to direct fluid released from the safety valve away from the descaling module.

In some embodiments of the system, the descaling module further includes a pump configured to pump the descaling fluid from the container into the beverage maker.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A descaling module for a beverage maker is disclosed. Beverage makers on aircraft may require descaling on a regular basis. Descaling a beverage maker on an aircraft can be difficult, as the beverage maker unit may need to be removed, partially removed, and/or partially disassembled in order to access the ports needed for adding the descaling solutions. These methods are laborious and time consuming. On the other hand, the disclosed descaling module can be inserted into a beverage maker for a more streamlined and automated descaling process.

Figure 1A:
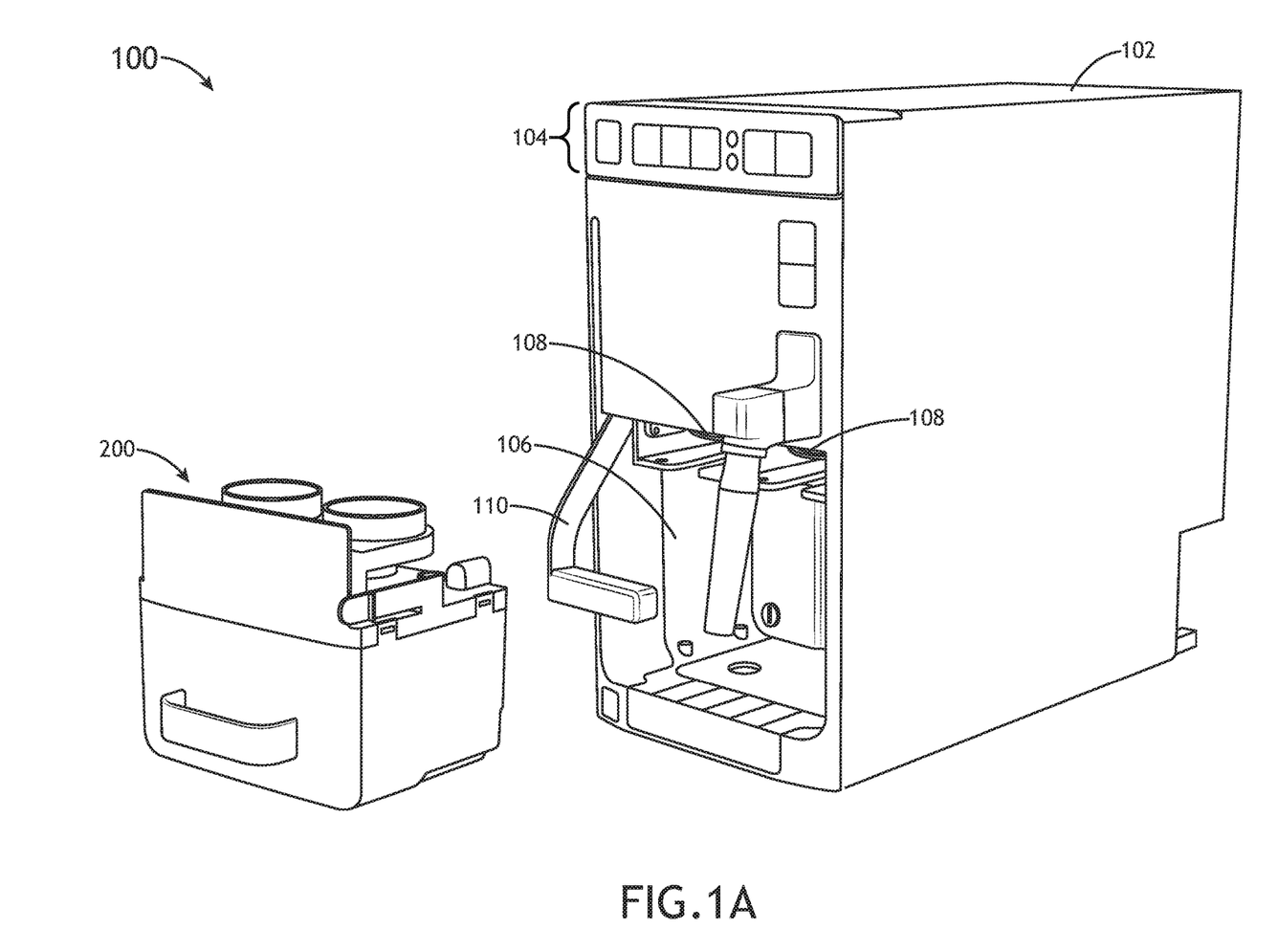
FIG. 1A is a perspective view of a beverage maker and a descaling module, in accordance with one or more embodiments of this disclosure.

FIG. 1A illustrates a system 100 that includes a beverage maker 102 and a decaling module 200 for descaling the beverage maker 102. The beverage maker 102 may be any device that produces a beverage. For example, the beverage maker 102 illustrated in FIG. 1A is an espresso machine. However, in other embodiments, the beverage maker 102 may be a cappuccino maker, a latte maker, a coffee maker, a hot water tap, a soda fountain, a slushie machine, or the like.

The beverage maker 102 includes a user interface 104 (e.g., one or more buttons, switches, dials, knobs, a LCD/LED display, a touch panel, a touchscreen display, or any combination thereof) that can be used to turn on/off the beverage maker 102 and/or adjust one or more parameters of the beverage maker 102 (e.g., water temperature, brew intensity). Additionally, the user interface 104 may be configured to receive a user input to select an operational mode (e.g., brew mode, cleaning mode, descaling mode, etc.). For example, the user interface 104 may be used to initiate a descaling mode or sequence.

The beverage maker 102 also includes at least one brew head 108 (e.g., an espresso brew head, sometimes referred to as a "group head" or "brew group"). The brew head 108 may extend from the chassis of the beverage maker, or as shown in FIG. 1A, the brew head 108 may be disposed within a brew cavity 106. In some embodiments, the brew cavity 106 is a recessed region within the chassis of the beverage maker 102 where the dispensed beverage (e.g., espresso) may be delivered into a cup or other receptacle. In embodiments, the brew head 108 may include any device known in the art used for dispensing a beverage, including, but not limited to, a spout, spigot, nozzle, valve, tap, or the like. Furthermore, the beverage maker 102 may include two or more brew heads 108 (e.g., two brew heads 108, as shown in FIG. 1A) or a brew head 108 with multiple output ports (e.g., multiple nozzles, spouts, or the like).

In some embodiments, the beverage maker 102 further includes a retaining arm 110. When engaged, the retaining arm 110 may be configured to secure and/or stabilize liquid holding containers (e.g., mugs, cups, pots, cleaning modules, etc.) within the brew cavity 106. The retaining arm 110 may also be configured to retain brew cups, pods, or other devices that can hold espresso pods, coffee bags, or the like. The retaining arm 110 may be of any shape or form known in the art to secure and stabilize liquid holding containers. In embodiments, the retaining arm may also be configured as a safety device. For example, the retaining arm may be configured to prevent the beverage maker 102 from operating when the retaining arm is not engaged to secure and stabilize the liquid holding containers.

Figure 1B:
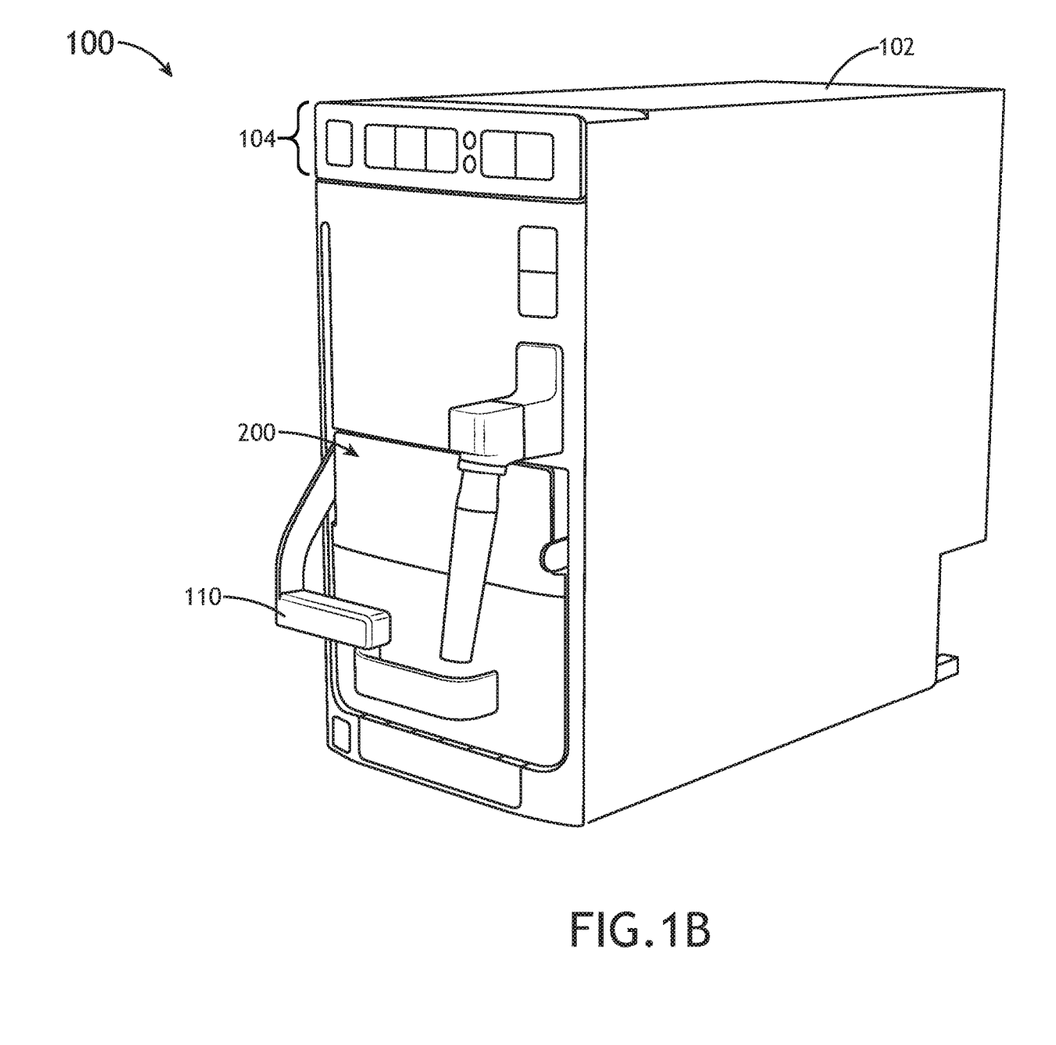
FIG. 1B is a perspective view of a descaling module inserted into a beverage maker, in accordance with one or more embodiments of this disclosure.

As shown in FIG. 1B, the descaling module 200 is configured to be coupled to one or more brew heads 108. In some embodiments, the descaling module 200 can be at least partially disposed within the brew cavity 106 of the beverage maker 102. The descaling module 200 is illustrated in FIGS. 2A through 2C, according to one or more embodiments of this disclosure.

Figure 2A:
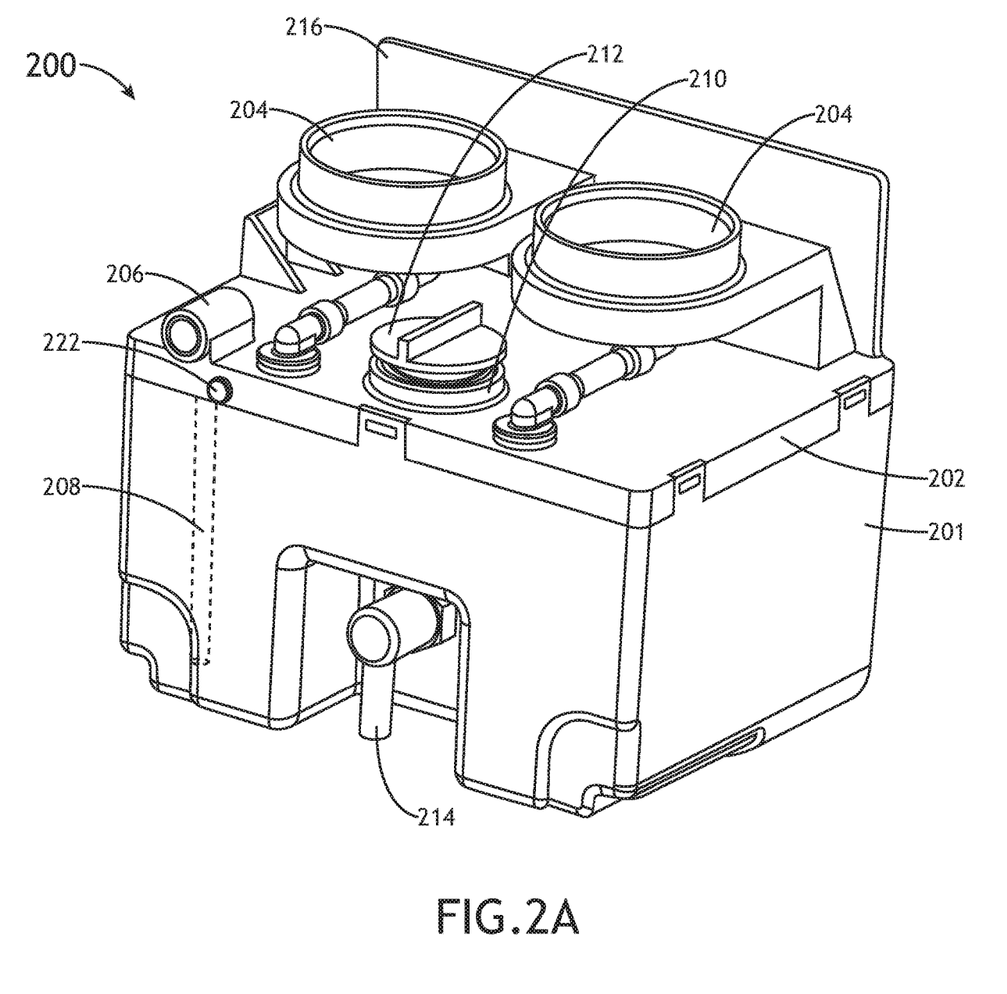
FIG. 2A is a perspective rear view of a descaling module, in accordance with one or more embodiments of this disclosure.
Figure 2B:
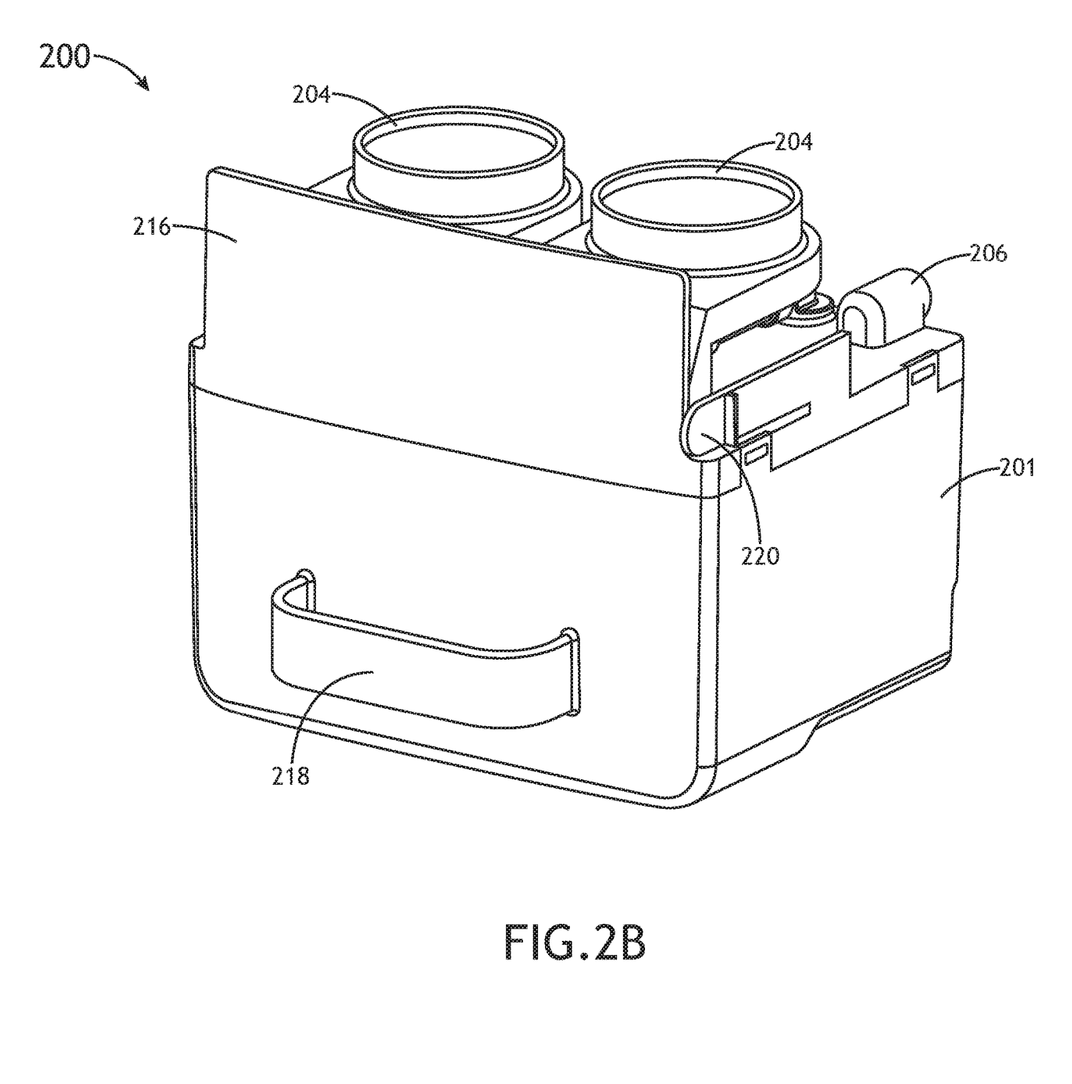
FIG. 2B is perspective front view of a descaling module, in accordance with one or more embodiments of this disclosure.
Figure 2C:
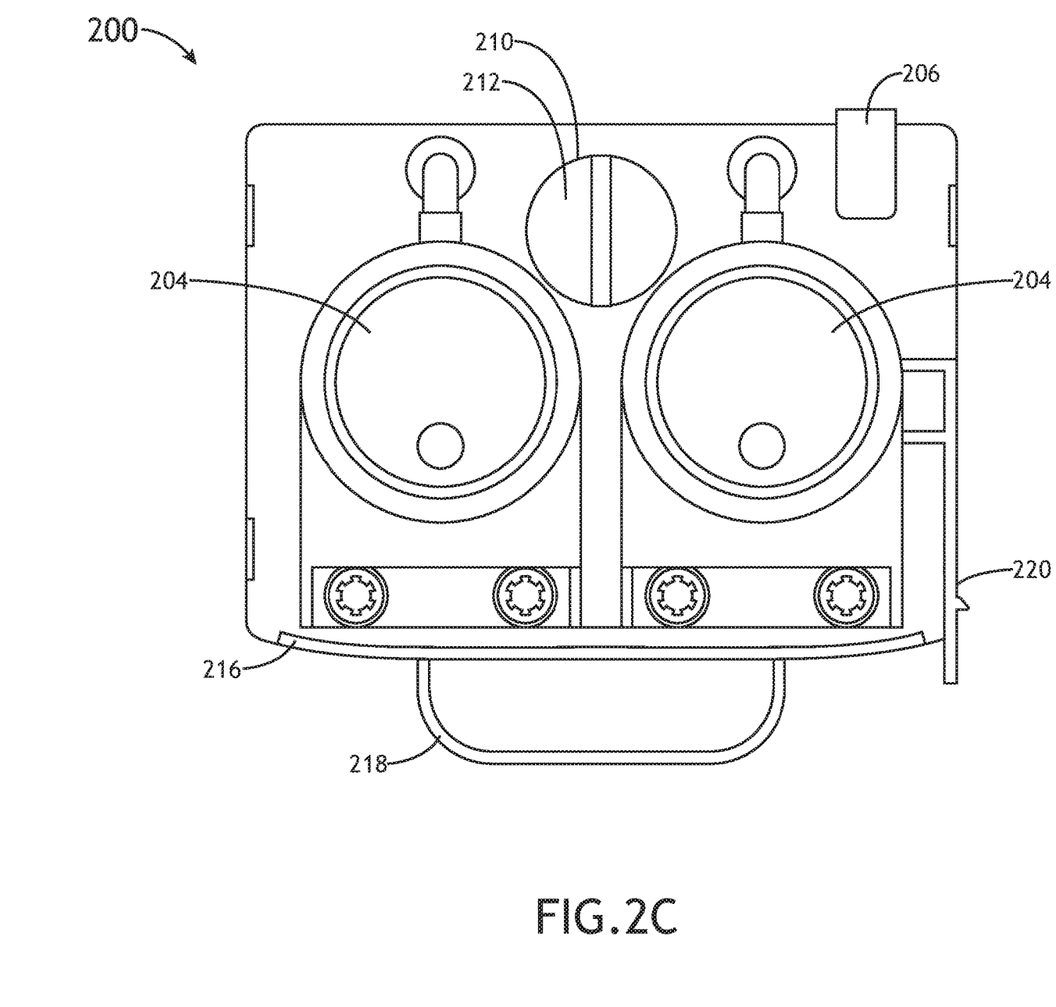
FIG. 2C is a top view of a descaling module, in accordance with one or more embodiments of this disclosure.

Referring to FIGS. 2A and 2B, the descaling module 200 includes a container 201 configured to hold a descaling fluid. The container 201 may be of any shape. For example, the container 201 may be a cube, a cuboid, rectangular prism, a sphere, a spheroid, cylinder, or any other three-dimensional shape. The container 201 may be constructed of any type of material known to hold a liquid. For instance, the container 201 may be constructed of plastic, glass, metal, carbon fiber, or any other substance commonly used to construct a container 201. In embodiments, the descaling fluid may include any descaling solution known in the art. For example, the descaling solution may include, but is not limited to, citric acid, acetic acid, hydrochloric acid, or the like.

The descaling module 200 may include a removably attached lid 202 that covers the container 201. The lid 202 may be constructed of any material known in the art to cover a container 201, including, but not limited to, plastic, rubber, glass, metal, carbon fiber. The lid 202 may be further configured to be latched onto the container 201 using any technique known in the art for latching a lid 202 to a container 201, including, but not limited to, cam locks, slam latches, spring latches, pressure-retaining rings, snap-fit joints, or other fasteners (e.g., screws, bolts, etc.). The lid 202 may also be configured to be permanently affixed to the container 201. In some embodiments, the lid 202 may be permanently attached to one side of the container 201 by a hinge. Alternatively, instead of the lid 202, the container 201 may include a top surface that encloses or substantially encloses the container 201.

In some embodiments, the descaling module 200 further includes a fill port 210 that allows descaling fluid to be dispensed into the descaling module 200 in preparation for the descaling process. The fill port 210 can also allow fluid to be poured out of the descaling module 200 when the descaling process has been completed. The fill port 210 may be positioned on any part of the descaling module 200 (e.g., top, sides, or bottom). In some embodiments, the fill port 210 is located on the top (e.g., on the lid 202 or top surface) of the descaling module 200, allowing descaling fluid to be poured directly into the descaling module 200 when the descaling module 200 is in an upright position. In some embodiments, the fill port 210 can be closed with lid 212 (e.g., screw-on or snap-on lid), plug, stopper, valve or any other device that seals the fill port 210 to maintain pressure within the container 201 and/or prevent fluid from leaking out of the container 201 when the descaling module 200 is in use.

The descaling module 200 includes at least one input port 204 that is configured to couple with a respective brew head 108. In some embodiments, the descaling module 200 may include two or more input ports 204 (e.g., two input ports 204, as illustrated in FIG. 2A) that are configured to couple with respective brew heads 108 and/or respective brew head ports (e.g., nozzles, spouts, or the like). In embodiments, the coupling of the brew head 108 to the input port 204 may be achieved by a coupler attached to the input port 204 of the descaling module 200. Alternatively, the coupler may be a separate component. The coupling of the input port 204 to the brew head 108 may be accomplished by any coupler known in the art, including, but not limited to, an adaptor, a flange, a union, a reducer, or a sleeve.

The descaling module 200 also includes at least one output port 206 that is configured to flow the descaling fluid through a fluid path of the beverage maker 102 when pressurized fluid enters the container 201 through the one or more input ports 204 and forces the descaling fluid through the output port 206. For example, the beverage maker 102 may dispense water and/or descaling fluid from the one or more brew heads 108 into the container 201 through the one or more input ports 204, causing at least some of the fluid in the container 201 to be ejected through the output port 206, and into a fluid path of the beverage maker 102. This circular (or closed loop) flow allows the descaling fluid to cycle through the fluid path (e.g., reservoir, tubes, pipes, etc.) of the beverage maker 102. In some embodiments, the output port 206 is configured to couple with the steam outlet (e.g., steam port, froth port, froth module adaptor) of the beverage maker 102. In this regard, the output port 206 of the descaling module 200 may be coupled to the fluid path of the beverage maker 102 via the steam outlet. In other embodiments, the output port 206 may be configured to flow the descaling fluid into the beverage maker 102 through another port that leads to the reservoir of the beverage maker 102 and/or through a tube or line that directly couples the output port 206 to the reservoir and/or any other portion of the fluid path.

In some embodiments, the steam outlet of the beverage maker 102 may include an input element that is configured to couple with the output port 206 of the descaling module 200. For example, the input element may include, but is not limited to, a froth module adaptor, a steam wand, a steam wand adaptor, a shuttle end of a shuttle valve assembly, or any other input element that may couple to the output port 206 of the descaling module 200. In some embodiments, a coupler may be configured to attach to the output port 206 of the descaling module 200 and couple with the steam outlet and/or the input element (e.g., froth module adaptor, a steam wand, a steam wand adaptor, a shuttle end of a shuttle valve assembly) of the beverage maker 102. Alternatively, the coupler may be a stand-alone component. The coupling of the output port of the descaling module 200 to the steam outlet of the beverage maker 102 may be accomplished by any coupler known in the art, including, but not limited to, an adaptor, a flange, a union, a reducer, or a sleeve.

In some embodiments, the descaling module 200 includes a pickup tube 208 that extends from the output port 206 into the container 201. The pickup tube 208 may be configured to direct descaling fluid through the output port 206 of the container when descaling fluid enters the descaling module 200 through the input port 204. The pickup tube 208 may be configured to extend from the output port 206 to near the bottom of the descaling module 200, allowing efficient flow of descaling fluid into the pickup tube 208 while helping prevent or reduce air flow from the output port 206 into the fluid path of the beverage maker 102.

In some embodiments, the descaling module 200 further includes a safety valve 214. The safety valve 214 may permit the release of fluid from the descaling module 200 if the pressure within the descaling module 200 exceeds a threshold pressure level. In the system 100, the pressure within the descaling module 200 may be raised if the pumps of the beverage maker 102 run fluid through the brew heads into the descaling module 200 faster than the ability of the descaling fluid to exit through the output port 206. Any constriction or blockage the fluid path of the beverage maker 102 and/or the descaling module 200 can also lead to an increase of pressure within the descaling module 200. The safety valve 214 may reduce the risk of explosion due to excessive pressure in the container 201 by releasing fluid from the descaling module 200 when the pressure in the container 201 exceeds a threshold pressure level.

The safety valve 214 may be positioned on any part of the descaling module 200 (e.g., top, sides, or bottom). In some embodiments, the safety valve 214 allows fluid to be released into drip tray or drain when the descaling module 200 is installed within the beverage maker 102. The safety valve 214 may be of any type of safety valve known in the art, including, but not limited to, a spring-loaded pressure-relief valve, balanced bellows relief valve, or a pilot operated relief valve.

In embodiments, the safety valve 214 may be coupled to a tube configured to direct fluid released form the safety valve 214 away from the descaling module 200. High pressure in the descaling module 200 may cause the safety valve 214 installed on the descaling module 200 to engage, causing descaling fluid to be released out of the descaling module 200. The tube may protect the environment from the descaling fluid by directing the fluid away from the beverage maker 102. In embodiments, the tube is made of a semi-transparent or fully transparent material. The transparent nature of the tubing allows fluid escaping the safety valve 214 to be observed, indicating a problem with the descaling module 200 and/or the descaling cycle. In some embodiments, the tube coupled to the safety valve 214 may redirect the fluid to a drip tray or drain. Alternatively, the tube may direct the fluid to a waste container.

In some embodiments, the descaling module 200 further includes a shield 216 configured to redirect fluid that has escaped the descaling module 200 towards the beverage maker 102. The connections between the input ports 204 and the brew heads 108, as well as the connections between the input ports 206 and the steam outlets, are points along the system 100 that are at risk for leakage. During the descaling process, the descaling fluid is pressurized and may be heated. Leakage of descaling fluid at the input ports 204 and output ports 206 could spray and burn a person near the beverage maker 102 or cause damage to the nearby environment. The shield 216 may be configured to block and redirect any escaping fluid toward the beverage maker 102 (and away from a potential user standing in front of the beverage maker 102 during the descaling process). Referring to FIG. 1B, in embodiments, the shield 216 may be configured as a raised lip along the top side of the descaling module 200, running parallel to, and nearly flush with, the top of the entrance to the brew cavity 106 as the descaling module 200 is installed into the brew cavity 106 of the beverage maker 102. Alternatively, multiple shields 216 may be arranged around the one or more input ports 204 and/or output ports 206. The shield 216 may be of any design known in the art to divert escaping fluids. Therefore, the above description should not be regarded as limiting.

As shown in FIGS. 2B and 2C, the descaling module 200 may further include a handle 218 extending from the container 201 or lid 202. The handle 218 may allow the descaling module 200 to be efficiently and safely inserted into the brew cavity 106 of the beverage maker 102. The handle 218 may be of any type known in the art to install and remove a module (e.g., pull handle). The handle 218 may be positioned on any part of the descaling module 200 (e.g., top, sides, or bottom). In some embodiments, the handle 218 is located on the side of the descaling module 200 facing away from the beverage maker 102 when the descaling module 200 has been inserted into the brew cavity 106 of the beverage maker 102. In embodiments, the handle 218 is positioned horizontally relative to the upright position of the descaling module 200. In embodiments, the handle 218 may be positioned vertically relative to the upright position of the descaling module 200. In some embodiments, the handle 218 may be positioned neither horizontally nor vertically relative to the upright position of the descaling module 200.

In some embodiments, the descaling module 200 further includes a retaining tab 220 configured to releasably lock the descaling module 200 into an operating position. Proper alignment of the descaling module 200 in the brew cavity 106 of the beverage maker 102 is important in order for the descaling fluid to become pressurized during the descaling process and not escape the descaling module 200 through the input ports 204 or output ports 206. When the descaling module 200 is being installed into the brew cavity 106, the retaining tab 220 may be configured to engage when the descaling module 200 is in the correct operational position (e.g., the input port 204 is correctly coupled with the brew heads 108 and the output ports 206 are correctly coupled with the steam port). In embodiments, the retaining tab 220 can be disengaged by providing pressure by a finger or thumb upon the retaining tab 220 while the descaling module 200 is being pulled from the brew cavity 106. In embodiments, the retaining tab 220 is of any type that can guide and hold the descaling module 200 in the correct operational position. For instance, the retaining tab 220 may be a component of a snap-fit joint, a tongue and groove joint, or any other type of retaining tab 220 known in the art.

In some embodiments, the descaling module 200 further includes a pump configured to pump descaling fluid through the output port 206 of the descaling module 200 into the beverage maker 102. Use of a pump allows the descaling module 200 to operate and descale the beverage maker 102 while the beverage maker 102 is turned off. In embodiments, the pump may force descaling fluid through the output port 206 of the descaling module 200 into beverage maker, wherein the now pressurized and circulating descaling fluid reenters the descaling module 200 through the input port 204 via the brew heads 108 of the beverage maker 102. The pump may be of any type of pump used in the art to move fluids, including, but not limited to, a positive displacement pump (e.g., peristaltic pump, gear pump, plunger pump), an impulse pump or a velocity pump. The pump may be located at any place within the descaling module 200 that allows pumping of descaling fluid into the beverage maker 102. In some embodiments, the pump may be battery powered. The battery may be of any type of battery known in the art for powering a pump (e.g., zinc-carbon, alkaline, nickel-cadmium, nickel-zinc, nickel metal anhydride, lithium ion). Alternatively, the pump may be powered by an external AC or DC power source.

In some embodiments, the descaling module 200 further includes a detectable element 222 that allow the beverage maker 102 to detect a presence of the descaling module 200 when the descaling module 200 is disposed within the brew cavity 106 and/or coupled to the one or more brew heads 108 of the beverage maker 102. The detectable element 222 may be positioned on any part of the descaling module 200 (e.g., top, sides, or bottom). In some embodiments, the detectable element 222 is located on the side of the descaling module 200 that faces the beverage maker 102 when the descaling module 200 is disposed within the brew cavity 106 and/or coupled to the one or more brew heads 108.

Figure 3:
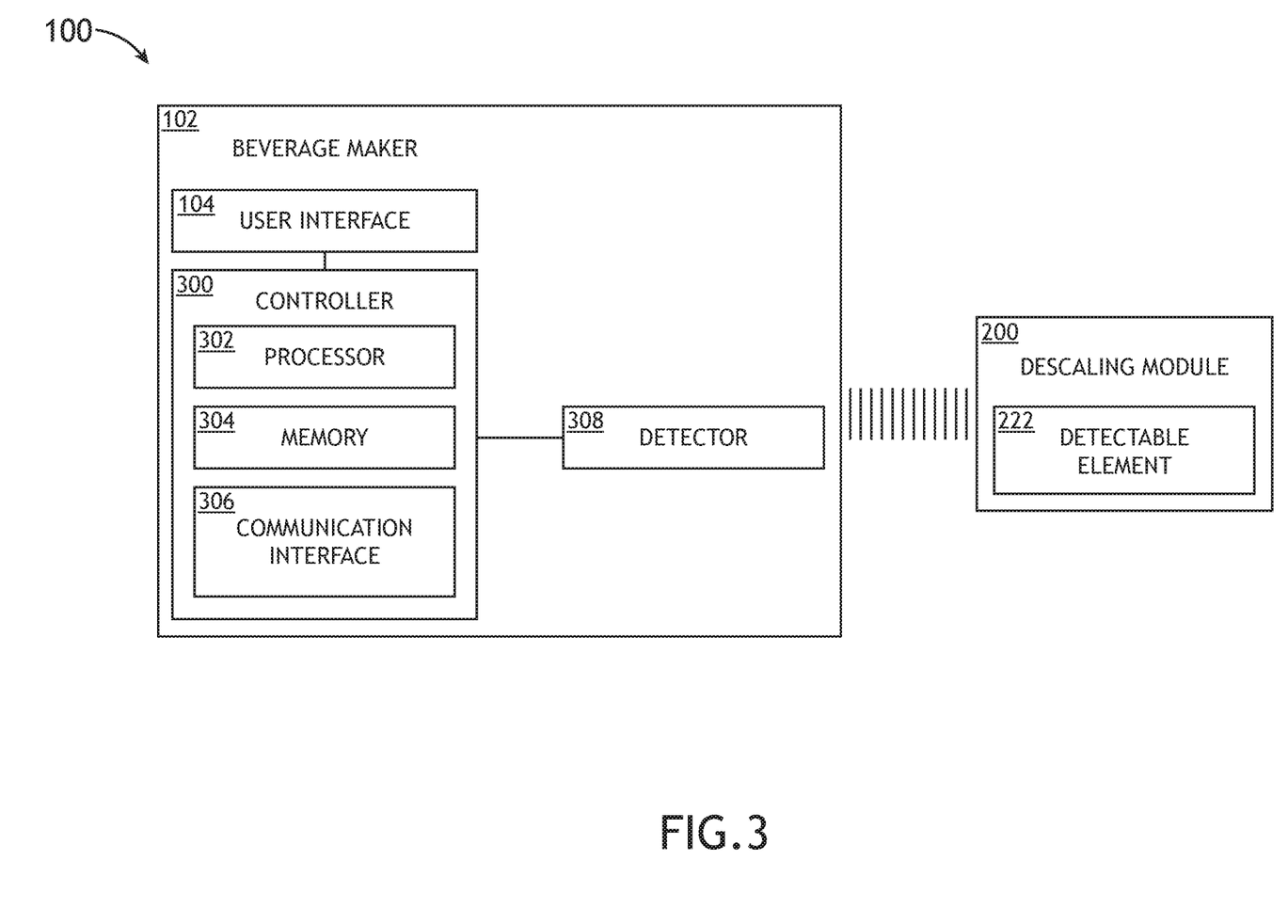
FIG. 3 is a block diagram illustrating a control system for a beverage maker, in accordance with one or more embodiments of this disclosure.

As shown in FIG. 3, the beverage maker 102 may include a detector 308 that is configured to sense the detectable element 222 when the descaling module 200 is disposed within the brew cavity 106 and/or coupled to the one or more brew heads 108 of the beverage maker 102. The detector 308 may be positioned on any part of the beverage maker 102 (e.g., top, sides, within the brew cavity 106). In some embodiments, the detector 308 is disposed within the brew cavity 106 and/or located on or near the one or more brew heads 108 so that the detector 308 is brought in proximity to the detectable element 222 of the descaling module 200 when the descaling module 200 is disposed within the brew cavity 106 and/or coupled to the one or more brew heads 108.

The detectable element 222 of the descaling module 200 and the detector 308 of the beverage maker 102 may employ any sensor protocol commonly used in the art for identifying swappable components. For example, in an embodiment, the detectable element 222 may be a magnet, and the detector 308 may be a reed switch that is transitioned from a first state (e.g., open) to a second state (e.g., closed) when the magnet is brought in proximity to the read switch. In another embodiment, the detectable element 222 may be an optical pattern or a recognizable feature (e.g., a barcode, QR code, or the like), and the detector 308 may be an optical sensor (e.g., barcode reader, camera, scanner, or the like). In yet another embodiment, the detectable element 222 may be a radio-frequency identification (RFID) tag, and the detector 308 may be an RDIF reader. It is noted herein that other detection technologies known in art can be used to identify a swappable component. Therefore, the above description should not be regarded as limiting. Furthermore, in some embodiments, the detectable element 222 may include a combination of detectable elements (e.g., magnet, RFID tag, optical pattern, etc.), and similarly the detector 308 may include a combination of detector types (e.g., optical/image sensor, RFID reader, reed switch, etc.) to allow for more robust detection and/or identification of the descaling module 200 by the beverage maker 102.

In embodiments, the beverage maker 102 further includes a controller 300 communicatively coupled to the user interface 104, detector 308, and other electronic/electromechanical components (e.g., sensors, pumps, actuators, etc.) of the beverage maker 102. The controller 300 may include at least one processor 302, memory 304, and a communication interface 306.

The processor 302 is configured to provide processing functionality for at least the controller 300 and can include any number of processors, micro-controllers, circuitry, field programmable gate array (FPGA) or other processing systems, and resident or external memory for storing data, executable code, and other information accessed or generated by the controller 300. The processor 302 is configured to execute one or more software programs embodied in a non-transitory computer readable medium (e.g., memory 304) that implement techniques described herein. The processor 302 is not limited by the materials from which it is formed or the processing mechanisms employed therein and, as such, can be implemented via semiconductor(s) and/or transistors (e.g., using electronic integrated circuit (IC) components), and so forth.

The memory 304 can be an example of tangible, computer-readable storage medium that provides storage functionality to store various data and/or program code associated with operation of the controller 300/processor 302, such as software programs and/or code segments, or other data to instruct the processor 302, and possibly other components of the controller 300, to perform the functionality described herein. Thus, the memory 304 can store data, such as a program of instructions for operating the controller 300, including its components (e.g., processor 302, communication interface 306, etc.), and so forth. It should be noted that while a single memory 304 is described, a wide variety of types and combinations of memory (e.g., tangible, non-transitory memory) can be employed. The memory 304 can be integral with the processor 302, can comprise stand-alone memory, or can be a combination of both. Some examples of the memory 304 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 306 can be operatively configured to communicate with components of the controller 300. For example, the communication interface 306 can be configured to retrieve data from the processor 302 or other devices (e.g., user interface 104, detector 308, etc.), transmit data for storage in the memory 304, retrieve data from storage in the memory 304, and so forth. The communication interface 306 can also be communicatively coupled with the processor 302 to facilitate data transfer between components of the controller 300 and the processor 302. It should be noted that while the communication interface 306 is described as a component of the controller 300, one or more components of the communication interface 306 can be implemented as external components communicatively coupled to the controller 300 via a wired and/or wireless connection. The controller 300 can also include and/or connect to one or more input/output (I/O) devices. In embodiments, the communication interface 306 includes or is coupled to a transmitter, receiver, transceiver, physical connection interface, or any combination thereof.

In embodiments, the controller 300 may be configured to detect the presence and/or identity of the descaling module 200 when the detector 308 senses the detectable element 222. The controller 300 may be configured to determine whether the descaling module 200 is correctly disposed within the brew cavity 106 and/or correctly coupled to the one or more brew heads 108 of the beverage maker 102 when the detector 308 senses the detectable element 222. In some embodiments, the controller 300 is configured to detect the identity of the descaling module 200 based on detection and/or communication with the detectable element 222. For example, the controller 300 may be configured to differentiate between different types of modules (e.g., descaling module 200, cleaning module, different beverage modules, etc.) based on data acquired by the detector 308 from the detectable element 222. For example, the detector 308 may collect identification data in the form of a barcode, QR code, image recognition, RFID, a particular positioning of the detectable element 222, any combination thereof, and so forth. In some embodiments, the controller 300 may also be configured to determine other information (e.g., descaling fluid type, amount of descaling fluid, etc.) associated with the descaling module 200 based on data collected from the detectable element 222 by the detector 308.

In response to detecting the presence and/or identity of the descaling module 200, the controller 300 may be configured to present a notification via the user interface 104, indicating that the descaling module 200 has been detected and/or that the beverage maker 102 is ready to be descaled. In some embodiments, the controller 300 is configured to hide or prevent access to a descaling option via the user interface 104 when the descaling module 200 is not detected. Conversely, the controller 300 can present the descaling option via the user interface 104 when the descaling module 200 is detected. In some embodiments, the controller 300 is further configured to automatically place the beverage maker 102 in a descaling mode of operation when the descaling module 200 is detected, such that other operations (e.g., brewing) are hidden via the user interface 104 and/or deactivated.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A descaling module for a beverage maker, wherein the beverage maker comprises a reservoir, comprising:
    a container comprising a single compartment configured to receive a descaling fluid;
    at least one input port configured to couple the container to a respective brew head of the beverage maker, wherein the container is configured outside of the reservoir; and
    at least one output port configured to flow the descaling fluid through a fluid path of the beverage maker when pressurized fluid enters the container through the at least one input port and forces the descaling fluid through the at least one output port, wherein the descaling fluid flows through the fluid path, the at least one input port, and the at least one output port in a closed loop.

2. The descaling module of claim 1, further comprising a detectable element configured to indicate at least one of a presence of the descaling module or an identity of the descaling module.

3. The descaling module of claim 1, further comprising a fill port for dispensing the descaling fluid into the container.

4. The descaling module of claim 1, further comprising a pickup tube coupled to the at least one output port and extending into the container, wherein the pickup tube is configured to direct the descaling fluid through the at least one output port when the pressurized fluid enters the container.

5. The descaling module of claim 1, further comprising a handle on an external surface of the container.

6. The descaling module of claim 1, further comprising a shield disposed adjacent to the at least one input port and configured to redirect fluid escaping from the at least one input port or the at least one output port toward the beverage maker.

7. The descaling module of claim 1, further comprising at least one retaining tab configured to releasably secure the descaling module in an operating position when the descaling module is disposed within a brew cavity of the beverage maker.

8. The descaling module of claim 1, further comprising a safety valve.

9. The descaling module of claim 8, wherein the safety valve is coupled to an at least partially transparent tube configured to direct fluid released from the safety valve away from the descaling module.

10. The descaling module of claim 1, further comprises a pump configured to pump the descaling fluid from the container into the beverage maker.

11. A system, comprising:
    a beverage maker configured with a reservoir; and
    a descaling module configured to be at least partially disposed within a brew cavity of the beverage maker and outside of the reservoir, the descaling module comprising:
        a container comprising a single compartment configured to receive a descaling fluid;
        at least one input port configured to couple the container to a respective brew head of the beverage maker; and
        at least one output port configured to flow the descaling fluid through a fluid path of the beverage maker when pressurized fluid enters the container through the at least one input port and forces the descaling fluid through the at least one output port, wherein the descaling fluid flows through the fluid path, the at least one input port, and the at least one output port in a closed loop.

12. The system of claim 11, wherein the beverage maker includes:
    a detector configured to sense a detectable element of the descaling module; and
    a controller communicatively coupled to the detector, the controller configured to detect at least one of a presence of the descaling module or an identity of the descaling module when the detector senses the detectable element of the descaling module.

13. The system of claim 11, wherein the descaling module further comprises a fill port for dispensing the descaling fluid into the container.

14. The system of claim 11, wherein the descaling module further comprises a pickup tube coupled to the at least one output port and extending into the container, wherein the pickup tube is configured to direct the descaling fluid through the at least one output port when the pressurized fluid enters the container.

15. The system of claim 11, wherein the descaling module further comprises a handle on an external surface of the container.

16. The system of claim 11, wherein the descaling module further comprises a shield disposed adjacent to the at least one input port and configured to redirect fluid escaping from the at least one input port or the at least one output port toward the beverage maker.

17. The system of claim 11, wherein the descaling module further comprises at least one retaining tab configured to releasably secure the descaling module in an operating position when the descaling module is disposed within the brew cavity of the beverage maker.

18. The system of claim 11, wherein the descaling module further comprises a safety valve.

19. The system of claim 18, wherein the safety valve is coupled to an at least partially transparent tube configured to direct fluid released from the safety valve away from the descaling module.

20. The system of claim 11, wherein the descaling module further comprises a pump configured to pump the descaling fluid from the container into the beverage maker.

* * * * *